2,802,751
Patented Aug. 13, 1957

2,802,751

HARDENING OXIDIZED WAX

Stanford J. Hetzel, Cheltenham, Pa., assignor to Sun Oil Company, Philadelphia, Pa., a corporation of New Jersey No Drawing. Application November 30, 1954,
Serial No. 472,250

4 Claims. (Cl. 106—270)

This invention relates to increasing the hardness of partially oxidized petroleum wax by the addition thereto of limed naphthenic acid, and to compositions obtained accordingly.

It is known in the art to partially oxidize petroleum wax to obtain products having elevated saponification number, e. g. at least 30 mg. of KOH per gram, and typically in the range from 50 to 150 mg. of KOH per gram. Such products are useful in various applications, e. g. as a constituent of emulsion polish formulations.

A highly important property of partially oxidized wax for use in certain applications is its hardness. Oxidized waxes, as originally prepared by partial oxidation, frequently have greater softness, i. e. higher penetration number, than is desirable in some applications of the waxes. Accordingly, it is desirable to reduce the penetration of such partially oxidized petroleum waxes in order that the waxes be satisfactory for use, for example, in durable polish formulations.

I have found that partially oxidized petroleum wax can be greatly improved in hardness by admixing limed naphthenic acid therewith.

The partially oxidized petroleum wax used according to this invention may have been prepared by any suitable method known in the art. Commonly employed conditions for oxidation of wax include oxidation temperatures within the range from 200° F. to 300° F., oxidation pressures within the range from atmospheric to 500 p. s. i. g., the use of free-oxygen containing gases, e. g. air, oxygen, ozone, ozonized air, etc., as oxidizing agent, and the use of an oxidation catalyst of the well known metallic oxidation catalyst type, e. g. manganese naphthenate. The partially oxidized product generally has a saponification number above about 30 mg. of KOH per gram and typically in the range of 50 to 150 mg. of KOH per gram.

The limed naphthenic acid used in this invention is prepared by fusing naphthenic acids with calcium hydroxide at elevated temperature. The naphthenic acids so treated are recovered from mineral oil in accordance with procedures which are well known to those skilled in the art of petroleum refining. Generally such procedures involve treating mineral oil with alkali metal hydroxide to form alkali metal naphthenate. These metal naphthenates can be extracted from the mineral oil as with an aqueous alcohol solvent, and recovered after acidification with mineral acid.

The naphthenic acids used in this invention may be any commercially available naphthenic acid fraction with an Acid No. in the range of about 100 to 250 mg. of KOH per gram. The naphthenic acids are preferably deoiled although complete deoiling is not essential for successful practice of this invention.

The naphthenic acids prior to use in this invention are limed—i. e. fused with calcium hydroxide at a temperature sufficiently high to promote the reaction between these constituents. Generally temperatures in the range of about 300° F. to 400° F. are suitable. Water, which is a product of the fusion reaction is driven off at the reaction conditions, leaving a molten reaction product which is predominantly calcium naphthenate and which contains inorganic matter such as calcium carbonate and unreacted lime as well as a minor amount of naphthenic acid.

The characteristics of the limed product are dependent upon the properties of the naphthenic acids treated, and upon the relative amounts of calcium hydroxide and naphthenic acids used in the reaction. Higher ratios of calcium hydroxide to naphthenic acids result in a limed product having superior hardness-improving properties when admixed with partially oxidized wax. It is generally desirable to fuse naphthenic acids with an amount of calcium hydroxide equivalent to that needed to react with a predominance and preferably with all of the naphthenic acids, although less calcium hydroxide may be utilized on some occasions. A reactant ratio of about 2:1 to 10:1 parts by weight of naphthenic acids to calcium hydroxide will normally be adequate to produce a limed product which is suitable for use in this invention.

Use of naphthenic acids having relatively high Acid No. is preferred since these acids can be fused to form a product which has a high calcium content and which is more suitable for use in this invention. Normally, naphthenic acids with an Acid No. above about 150 mg. of KOH per gram are preferred.

In carrying out the present invention, the limed naphthenic acid is incorporated in partially oxidized petroleum wax in amount sufficient to substantially increase the hardness thereof. It is generally preferred to admix a minor amount of limed naphthenic acid with a major proportion of partially oxidized wax since the resulting compositions are most useful in polish formulations, and the like applications. However, greater amounts of limed naphthenic acid can on occasion be advantageously used. A particularly preferred product for use in polish formulations comprises about 2 to 25% limed naphthenic acid in admixture with partially oxidized petroleum wax.

The product of this invention can be formed by heating the oxidized wax to a temperature sufficiently high to melt the wax, e. g. about 120° F. to 200° F., and intimately admixing limed acid with the melted wax. Other means known to those skilled in the art, however may be used. For example, the limed acid and oxidized wax can be dissolved in a mutual solvent such as petroleum spirits and intimately mixed. Or the limed naphthenic acid may be liquified by heating to a temperature in the range of about 200° F. to 450° F. and the oxidized wax added thereto with mixing.

The partially oxidized petroleum wax treated according to this invention may be either oxidized paraffin wax or oxidized microcrystalline wax. Unoxidized petroleum waxes cannot be treated in a manner similar to that of the present invention since the addition of limed naphthenic acid to such unoxidized petroleum wax is substantially ineffective in increasing the hardness thereof.

The following example illustrates the invention:

A petroleum microcrystalline wax having a penetration at 77° F. of 5, a SUS viscosity at 210° F. of 85, and a melting point of 193° F. (ASTM D127–49) was oxidized for 27.5 hours at about 255° F. by contact with ozone. No oxidation catalyst was used. The resulting partially oxidized wax had a Sap. No. of 101 mg. of KOH per gram, a melting point of 176° F., and a penetration at 77° F. of 22.

Homogeneous blends of this oxidized wax and limed naphthenic acid were obtained by heating mixtures of these components to about 250° F. with agitation. The following table shows the proportions of components in each blend as well as the properties of each blend.

| Limed Naphthenic Acid, Weight Percent | Penetration at 77° F. | Melting Point, ° F. |
|---|---|---|
| 0 | 22 | 176 |
| 2 | 14 | 175 |
| 5 | 13 | 174 |
| 10 | 12 | 175 |
| 20 | 7 | 175 |
| 30 | 4 | 175 |
| 40 | 3 | 182 |

These results show that substantial penetration number decreases can be obtained by mixing partially oxidized petroleum wax with limed naphthenic acid.

The limed naphthenic acid used in this example was prepared by reacting refined naphthenic acid having an Acid No. of 156 mg. of KOH per gram with calcium hydroxide. The ratio of reactants was 3.7 parts of naphthenic acid per part of calcium hydroxide, and the reaction was conducted at a temperature in the range of about 300° F. to 400° F. The resulting limed naphthenic acid had an inorganic calcium carbonate content of about 9%, and an organically combined calcium content of about 8%.

By way of comparison, limed naphthenic acid was blended with unoxidized petroleum wax having a penetration at 77° F. of 12 and a melting point of 155° F. in a manner similar to that described above. The following table illustrates the results obtained:

| Limed Naphthenic Acid, Weight Percent | Penetration at 77° F. | Melting Point, ° F. |
|---|---|---|
| 0 | 12 | 155 |
| 10 | 11 | 153 |
| 20 | 11 | 153 |

These results show that the addition of limed naphthenic acid to the unoxidized petroleum wax was substantially ineffective in increasing the hardness thereof. The addition of 20% of limed naphthenic acid only reduced the penetration number from 12 to 11. As seen in the preceding example, the addition of 20% of limed naphthenic acid to oxidized petroleum wax reduced the penetration number thereof from 22 to 7.

I claim:

1. The method of preparing a relatively hard partially oxidized petroleum wax composition which comprises incorporating in a partially oxidized petroleum wax having saponification number above about 30 mg. of KOH per gram limed naphthenic acid in amount sufficient to substantially increase the hardness.

2. The method of preparing a relatively hard partially oxidized wax composition which comprises incorporating in a partially oxidized petroleum wax having saponification number above about 30 mg. of KOH per gram, 2 to 25% of limed naphthenic acid.

3. Composition comprising (1) partially oxidized petroleum wax having saponification number above about 30 mg. of KOH per gram and (2) limed naphthenic acid in amount sufficient to substantially increase the hardness of said partially oxidized wax.

4. Composition comprising 75% to 98% of partially oxidized petroleum wax having saponification number above about 30 mg. of KOH per gram and 2% to 25% of limed naphthenic acid.

References Cited in the file of this patent

UNITED STATES PATENTS

| | | |
|---|---|---|
| 2,128,523 | Burwell | Aug. 30, 1938 |
| 2,495,575 | Ellern | Jan. 24, 1950 |
| 2,682,553 | Kirk et al. | June 29, 1954 |
| 2,705,205 | Sullivan | Mar. 29, 1955 |

OTHER REFERENCES

Bennett's: "Commercial Waxes," Brooklyn, New York (1944), page 64.